US008153326B2

(12) United States Patent
Craft, Jr. et al.

(10) Patent No.: US 8,153,326 B2
(45) Date of Patent: Apr. 10, 2012

(54) ELECTRONICS CABINET WITH AIR FEED AND EXHAUST SYSTEM FOR BACKUP POWER FUEL CELL

(75) Inventors: Thomas F. Craft, Jr., Murphy, TX (US); Bob Campbell, Irving, TX (US); Anil K. Trehan, Plano, TX (US); David Reichert, Toronto (CA)

(73) Assignee: CommScope, Inc. of North Carolina, Hickory, NC (US)

( * ) Notice: Subject to any disclaimer, the term of this patent is extended or adjusted under 35 U.S.C. 154(b) by 425 days.

(21) Appl. No.: 12/416,113

(22) Filed: Mar. 31, 2009

(65) Prior Publication Data

US 2009/0286119 A1 Nov. 19, 2009

Related U.S. Application Data

(60) Provisional application No. 61/041,575, filed on Apr. 1, 2008, provisional application No. 61/047,016, filed on Apr. 22, 2008, provisional application No. 61/047,031, filed on Apr. 22, 2008.

(51) Int. Cl.
*H01M 2/38* (2006.01)
(52) U.S. Cl. ........................................... 429/460
(58) Field of Classification Search .................. 429/460, 429/456–459
See application file for complete search history.

(56) References Cited

U.S. PATENT DOCUMENTS

| | | | |
|---|---|---|---|
| 3,523,830 A | 8/1970 | Baker et al. | |
| 4,782,669 A | 11/1988 | Trocciola et al. | |
| 5,200,278 A | 4/1993 | Watkins et al. | |
| 5,314,762 A * | 5/1994 | Hamada et al. | 429/408 |
| 5,316,869 A | 5/1994 | Perry et al. | |
| 5,616,431 A * | 4/1997 | Kusunoki et al. | 429/460 |
| 6,087,028 A | 7/2000 | Goto | |
| 6,232,006 B1 | 5/2001 | Breault | |
| 6,673,482 B2 | 1/2004 | Imazeki et al. | |
| 6,885,112 B2 | 4/2005 | Johnson | |
| 6,916,566 B2 | 7/2005 | Saloka et al. | |
| 7,005,206 B2 * | 2/2006 | Lawrence et al. | 429/447 |
| 7,100,385 B2 | 9/2006 | Craft, Jr. et al. | |
| 7,205,062 B2 * | 4/2007 | Tawfik et al. | 429/458 |
| 7,264,895 B2 | 9/2007 | White | |
| 7,316,855 B2 * | 1/2008 | Lawrence et al. | 429/492 |
| 7,602,073 B2 | 10/2009 | Meyers et al. | |
| 2001/0049039 A1 | 12/2001 | Haltiner, Jr. | |
| 2002/0037447 A1 | 3/2002 | Imaseki et al. | |
| 2002/0119354 A1 | 8/2002 | O'Brien et al. | |
| 2003/0031904 A1 | 2/2003 | Haltiner, Jr. | |

(Continued)

FOREIGN PATENT DOCUMENTS

EP 1 187 242 3/2002

(Continued)

*Primary Examiner* — Jean F Duverne
(74) *Attorney, Agent, or Firm* — Muncy, Geissler, Olds & Lowe, PLLC

(57) ABSTRACT

A fuel cell cabinet air feed and exhaust system is provided. The air feed and exhaust system includes a sealed air feed system that feeds air from outside a fuel cell cabinet to a fuel cell disposed inside the fuel cell cabinet, and a sealed air exhaust system that exhausts air from the fuel cell to the outside of the fuel cell cabinet. Each of the sealed air system and the sealed air exhaust system is sealed with respect to the fuel cell such that the sealed air system, the sealed air exhaust system, and the fuel cell form a sealed system.

20 Claims, 14 Drawing Sheets

U.S. PATENT DOCUMENTS

| | | |
|---|---|---|
| 2003/0039872 A1 | 2/2003 | Grasso et al. |
| 2003/0039873 A1 | 2/2003 | Condit et al. |
| 2003/0087139 A1 | 5/2003 | White |
| 2003/0170528 A1 | 9/2003 | Simpson et al. |
| 2004/0053104 A1* | 3/2004 | Novkov et al. .......... 429/34 |
| 2004/0146761 A1 | 7/2004 | Cargnelli et al. |
| 2004/0161657 A1 | 8/2004 | Simpson et al. |
| 2005/0074644 A1 | 4/2005 | Ueda et al. |
| 2005/0091922 A1 | 5/2005 | Goebel et al. |
| 2005/0129990 A1 | 6/2005 | Ozeki et al. |
| 2005/0262818 A1 | 12/2005 | Stenersen |
| 2006/0078777 A1 | 4/2006 | Grimes et al. |
| 2006/0105209 A1 | 5/2006 | Thyroff et al. |
| 2006/0151156 A1 | 7/2006 | Valensa et al. |
| 2006/0166056 A1 | 7/2006 | Nakamura et al. |
| 2006/0199064 A1 | 9/2006 | Arnold et al. |
| 2006/0204412 A1 | 9/2006 | Rizzo et al. |
| 2006/0246328 A1 | 11/2006 | Willets et al. |
| 2007/0059583 A1* | 3/2007 | Vinsant ............ 429/39 |
| 2007/0275281 A1 | 11/2007 | White |
| 2008/0038610 A1 | 2/2008 | Darling |
| 2008/0138671 A1 | 6/2008 | Kolodziej et al. |
| 2008/0268300 A1 | 10/2008 | Pfefferle |
| 2009/0035616 A1 | 2/2009 | Darling et al. |
| 2009/0123797 A1 | 5/2009 | Kaye et al. |
| 2010/0221642 A1 | 9/2010 | Frahm et al. |
| 2011/0039177 A1 | 2/2011 | Yamaga et al. |

FOREIGN PATENT DOCUMENTS

| | | |
|---|---|---|
| WO | WO 2008/016257 | 2/2008 |

* cited by examiner

ELECTRONICS CABINET WITH AIR FEED AND EXHAUST SYSTEM FOR BACKUP POWER FUEL CELL

CLAIM OF PRIORITY UNDER 35 U.S.C. §119

The present invention claims the benefit of Provisional Application No. 61/041,575 entitled "Liquid Cooling System for Fuel Cell Cabinets, Air Feed System for Fuel Cell Cabinets, Heat Management and Thermal Control of Cabinets for Fuel Cells, and EcoPower Cabinet" filed Apr. 1, 2008, Provisional Application No. 61/047,016 entitled "Cabinet Air Feed and Exhaust System for Hydrogen Fuel Cell Declassification" filed Apr. 22, 2008, and Provisional Application No. 61/047,031 entitled "Fuel Cell Cabinet Waste Water Management System" filed Apr. 22, 2008, the entire contents of which are hereby incorporated by reference.

REFERENCE TO CO-PENDING APPLICATIONS FOR PATENT

The present application for patent is related to the following co-pending U.S. patent applications:

"ELECTRONICS CABINET WITH LIQUID COOLING SYSTEM FOR BACKUP POWER FUEL CELL" (U.S. Application Ser. No. 12/416,087), filed Mar. 31, 2009, assigned to the assignee hereof, and the entire contents of which are hereby incorporated by reference;

"ELECTRONICS CABINET WITH AIR FEED SYSTEM FOR BACKUP POWER FUEL CELL" (U.S. Application Ser. No. 12/416,096), filed Mar. 31, 2009, assigned to the assignee hereof, and the entire contents of which are hereby incorporated by reference;

"ELECTRONICS CABINET WITH HEAT MANAGEMENT AND THERMAL CONTROL SYSTEM FOR BACKUP POWER FUEL CELL" (U.S. Application Ser. No. 12/416,106), filed Mar. 31, 2009, assigned to the assignee hereof, and the entire contents of which are hereby incorporated by reference; and "ELECTRONICS CABINET WITH WASTE WATER MANAGEMENT SYSTEM FOR BACKUP POWER FUEL CELL" (U.S. Application Ser. No. 12/416,116), filed Mar. 31, 2009, assigned to the assignee hereof, and expressly incorporated by reference herein.

FIELD OF THE INVENTION

The present invention relates to cabinets for housing electronic equipment. More particularly, the present invention relates to a cabinet for housing electronic equipment and a connection panel for cross-connecting the electronic equipment with various provider and/or subscriber lines, wherein the cabinet includes a fuel cell power backup system, and more particularly, to a fuel cell cabinet air feed and exhaust system for hydrogen declassification.

BACKGROUND OF THE INVENTION

Outdoor cabinets that house electronic equipment and connection panels are generally known in the art. The connection panel (sometimes referred to as a feeder-distribution interface), within the cabinet, is used to connect subscriber lines to provider lines directly, or in parallel or serial, with terminals of certain electronic equipment also within the cabinet, such as surge protectors, switches, servers, etc.

In some conventional cabinets, the electronic equipment includes a fuel cell power backup system. A fuel cell, such as a hydrogen fuel cell, combines hydrogen fuel and oxygen from the air to generate electricity. The fuel cell cabinet and components of the fuel cell cabinet may require explosion proof certification/approval of each component, which may increase the costs and complexity associated with deploying and operating these cabinets.

SUMMARY OF THE INVENTION

These problems and others are addressed by the present invention, a first aspect of which comprises a fuel cell cabinet air feed and exhaust system including a sealed air feed system that feeds air from outside a fuel cell cabinet to a fuel cell disposed inside the fuel cell cabinet; a sealed air exhaust system that exhausts air from the fuel cell to the outside of the fuel cell cabinet, wherein each of the sealed air feed system and the sealed air exhaust system is sealed with respect to the fuel cell such that the sealed air feed system, the sealed air exhaust system, and the fuel cell form a sealed system.

Another aspect comprises a fuel cell cabinet including an air feed system that feeds air to a sealed fuel cell casing encapsulating a fuel cell; an air exhaust system that exhausts air from the sealed fuel cell casing, wherein the air feed system includes a sealed air feed line that feeds air from outside the fuel cell cabinet to the sealed fuel cell casing, wherein the air exhaust system includes a sealed air exhaust line that exhausts air from the sealed fuel cell casing to the outside of the fuel cell cabinet, and wherein each of the sealed air feed system and the sealed air exhaust system is sealed with respect to the sealed fuel cell casing such that the sealed air feed system, the sealed air exhaust system, and the sealed fuel cell casing form a sealed subsystem of the fuel cell cabinet.

Another aspect comprises a fuel cell cabinet including a sealed fuel cell casing encapsulating a fuel cell; an air feed system that feeds air to the sealed fuel cell casing; and an air exhaust system that exhausts air from the sealed fuel cell casing, wherein the air feed system includes a sealed air feed line that feeds air from outside the fuel cell cabinet to the sealed fuel cell casing, wherein the air exhaust system includes a sealed air exhaust line that exhausts air from the sealed fuel cell casing to the outside of the fuel cell cabinet, and wherein each of the sealed air feed system and the sealed air exhaust system is sealed with respect to the sealed fuel cell casing such that the sealed air feed system, the sealed air exhaust system, and the sealed fuel cell casing form a sealed subsystem of the fuel cell cabinet.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

Figure 1A:
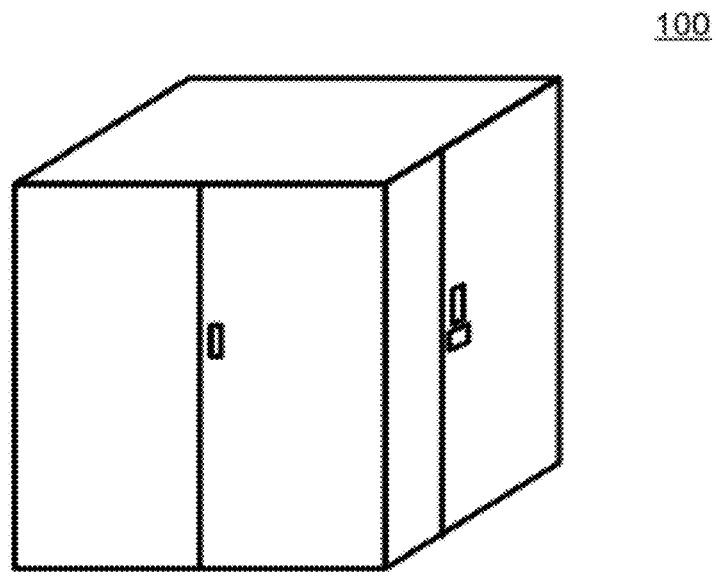
FIG. 1A is a perspective view of a cabinet, according to an embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Exemplary aspects are directed to a cabinet for housing electronic equipment, wherein the cabinet includes a fuel cell power backup system, and more particularly, to a fuel cell cabinet air feed and exhaust system for hydrogen declassification.

To solve the aforementioned problems with the conventional systems, the aspects provide a fuel cell cabinet air feed and exhaust system having a sealed air feed system that feeds air from outside a fuel cell cabinet to a fuel cell disposed inside the fuel cell cabinet, and a sealed air exhaust system that exhausts air from the fuel cell to the outside of the fuel cell cabinet. Each of the sealed air feed system and the sealed air exhaust system is sealed with respect to the fuel cell such that the sealed air feed system, the sealed air exhaust system, and the fuel cell form a sealed system.

An aspect provides an advantage of forming a sealed subsystem within the fuel cell cabinet. Because the subsystem is sealed throughout and vents directly to the outside environment, the subsystem may require explosion proof certification/approval of the subsystem components only. Therefore, the aspects may not require any other components outside of the sealed subsystem to obtain explosion proof certification, which may reduce costs and complexity associated with the certification/approval process.

Aspects also may improve or maximize the use of the space in the interior of the fuel cell cabinet or reduce the cabinet size compared with conventional systems such that the size of the foot print required for the fuel cell cabinet is reduced. Aspects also can provide a system that is not limited by outdoor exposure temperatures and can operate in extreme cold or hot climates. Aspects also can utilize a standard telecom cabinet, thereby increasing a comfort level of a user of the cabinet.

Exemplary aspects will now be described with reference to FIGS. 1A-13B.

Figure 1B:
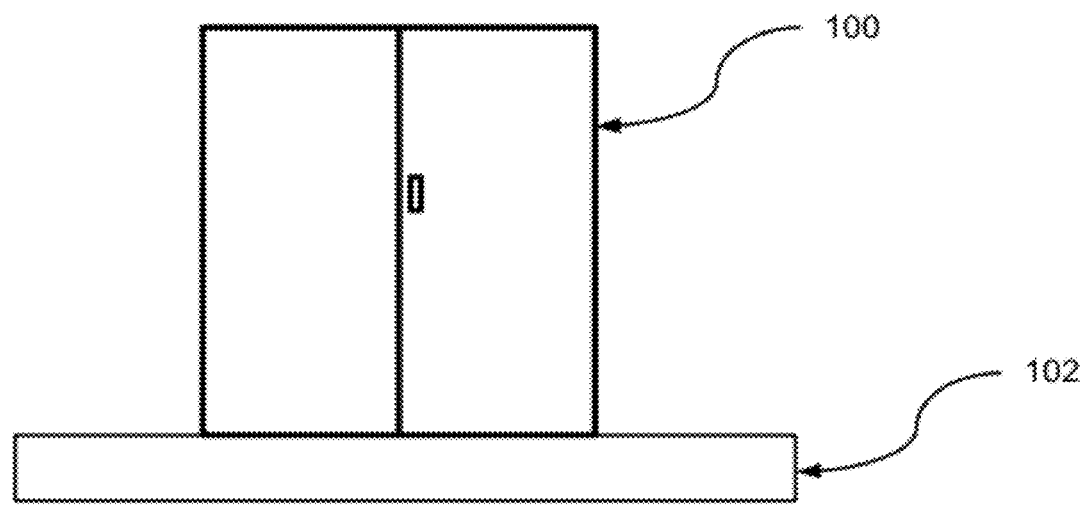
FIG. 1B is a plan view of a cabinet, according to an embodiment of the invention.

A fuel cell cabinet 100 according to an aspect is illustrated in FIGS. 1A and 1B. The fuel cell cabinet 100 may house electronic equipment and a connection panel for cross-connecting the electronic equipment with various provider and/or subscriber lines. The fuel cell cabinet 100 includes a fuel cell power backup system. As shown in FIG. 1B, the fuel cell cabinet 100 can be mounted on the surface of, for example, a concrete pad 102. The surface upon which the fuel cell cabinet 100 can be mounted is not limited to a concrete pad 102 and can include any suitable surface, device, or structure, such as a pad or mounting surface formed from fiberglass, plastic, metal, etc. Aspects of the fuel cell cabinet can be mounted in the interior of buildings, structures, etc., or at the exterior of building, structures, etc. For example, an aspect of a fuel cell cabinet 100 can be mounted on a rack or shelter or other structure (not shown). The fuel cell cabinet 100 includes a fuel cell cabinet air feed and exhaust system for hydrogen declassification.

Figure 2:
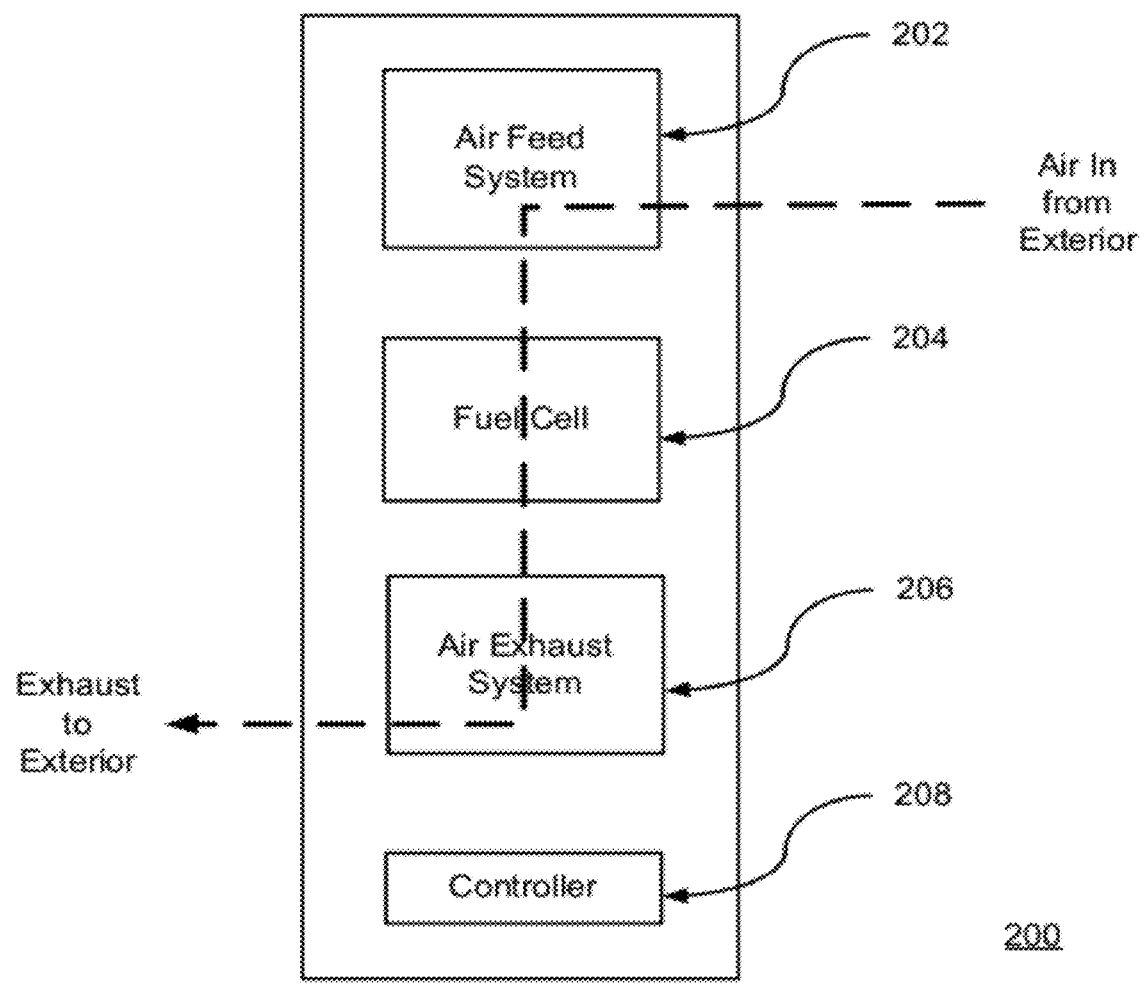
FIG. 2 is a schematic of a cabinet, according to an embodiment of the invention.

With reference to FIG. 2, an aspect of a fuel cell cabinet air feed and exhaust system 200 for hydrogen declassification will now be described. In this aspect, an exhaust system 206 draws air in from the exterior of the cabinet through an air feed system 202, through a fuel cell 204, and into the exhaust system 206. The exhaust system 206 purges or exhausts the gases from the fuel cell 204 to the exterior of the cabinet. A controller 208 controls the operation of one or more fans in the exhaust system. The controller 208 can selectively control one or more fans in the exhaust system to provide a predetermined air flow rate, which may depend on factors such as whether the fuel cell is preparing to start up, whether the fuel cell is operating, or whether the fuel cell has ceased operating, as well as the outside (ambient) temperature of the cabinet.

In an aspect, each of the air feed system 202, the fuel cell 204, and the exhaust system 206 are sealed. Also, each of the components is sealed with respect to each adjacent component. Therefore, these components provide an advantage of forming a sealed subsystem within the fuel cell cabinet. Because the subsystem is sealed throughout and vents directly to the outside environment, the subsystem may require explosion proof certification/approval of the subsystem components only. Therefore, the aspect may not require any other components outside of the sealed subsystem to obtain explosion proof certification, which may reduce the costs and complexity associated with the certification/approval process.

Figure 3:
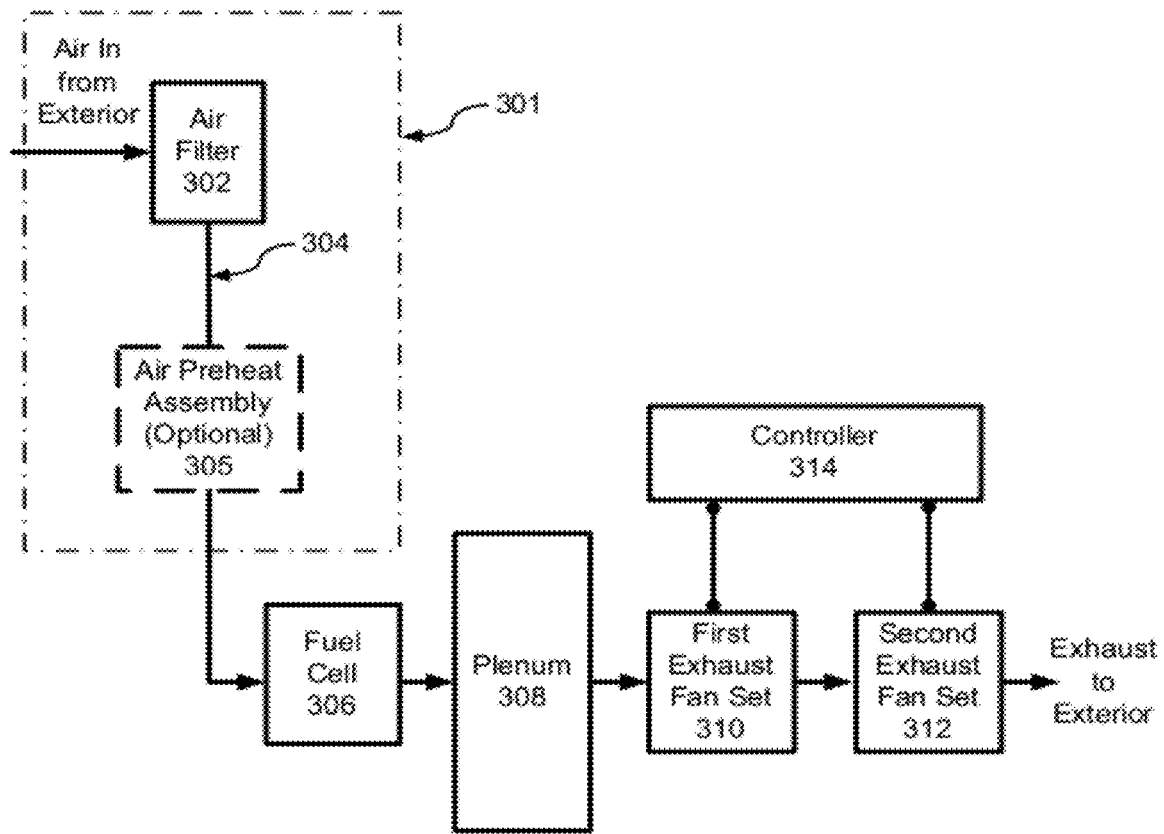
FIG. 3 is a schematic of a cabinet, according to an embodiment of the invention.

With reference to FIG. 3, another aspect of a fuel cell cabinet air feed and exhaust system 300 for hydrogen declassification will now be described. In this aspect, intake air enters the cabinet from the exterior through an air feed system 301. In an aspect, the air feed system 301 can include an air filter 302.

In an aspect, the air feed system 301 can include an optional air preheat assembly 305 having one or more heaters. The air preheat assembly 305 receives the intake air and preheats the intake air to a predetermined temperature, or to be within a predetermined temperature range. For example, the air preheat assembly 305 can receive intake air having an ambient air temperature of 0° C. and preheat the air to a temperature equal to or greater than 5° C. prior to entering the fuel cell 306. The optional air preheat assembly 305 can maintain a substantially constant air feed temperature to the fuel cell 306. In another aspect, a controller 314, which will be described in more detail below, can selectively control the temperature of the air in the air preheat assembly 305.

The intake air is supplied to the fuel cell 306 by a sealed air feed line or tube 304. The fuel cell 306 exhausts the air to a plenum 308, which is sealed to the fuel cell 306. One or more first exhaust fans 310 draw the air in from the exterior through the air feed system 301 (e.g., the air filter 302, the sealed air feed line 304, and the optional air preheat assembly 305), the fuel cell 306, and the plenum 308. In this aspect, one or more second exhaust fans 312 pull the air, which is exhausted by the first exhaust fans 310, out of the fuel cell cabinet. In an aspect, the system 300 is sealed and operates under a vacuum from the intake from the exterior until the exhaust to the exterior of the electronics compartment such that hazardous gases can be prevented from escaping into the interior of the fuel cell cabinet.

A controller 314 controls the operation of the first exhaust fan or set 310 and the second exhaust fan or set 312. The controller 314 can selectively control one or more fans in the exhaust system to provide a predetermined air flow rate, which may depend on factors such as whether the fuel cell is preparing to start up, whether the fuel cell is operating, or whether the fuel cell has ceased operating, as well as the outside (ambient) temperature of the cabinet.

In an aspect, each of the air feed system 301, fuel cell 306, plenum 308, first exhaust fan set 310, and second exhaust fan set 312 are sealed. Also, each of the components is sealed with respect to each adjacent component. Therefore, these components provide an advantage of forming a sealed subsystem within the fuel cell cabinet. Because the subsystem is sealed throughout and vents directly to the outside environment, the subsystem may require explosion proof certification/approval of the subsystem components only. Therefore, the aspect may not require any other components outside of the sealed subsystem to obtain explosion proof certification, which may reduce the costs and complexity associated with the certification/approval process.

An exemplary aspect of a fuel cell 400 and plenum 500, which can be mounted or secured in the exemplary cabinet 100, will be described with reference to FIGS. 4A and 4B, and FIGS. 5A and 5B.

Figure 4A:
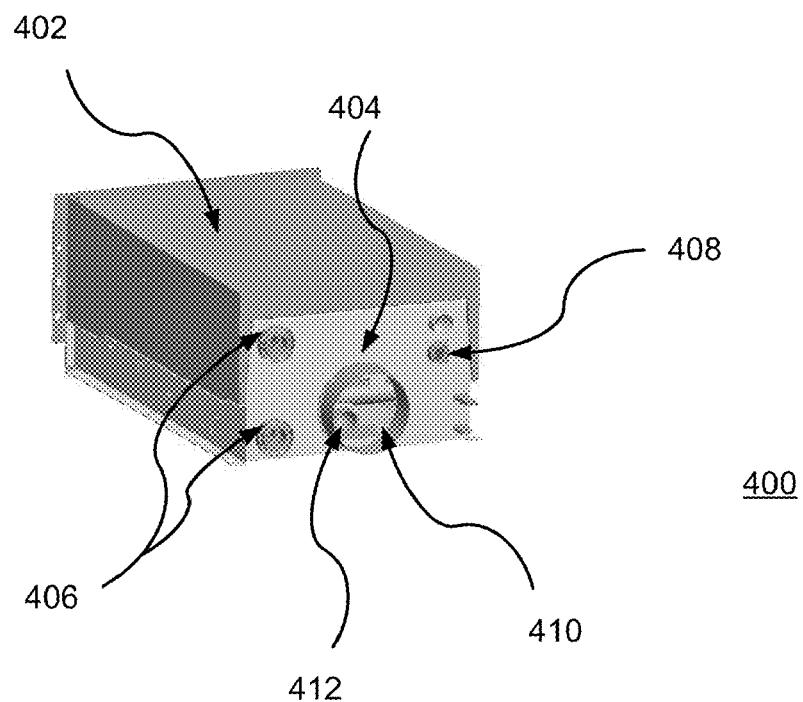
FIGS. 4A and 4B are perspective views of the fuel cell assembly, according to an embodiment of the invention.
Figure 4B:
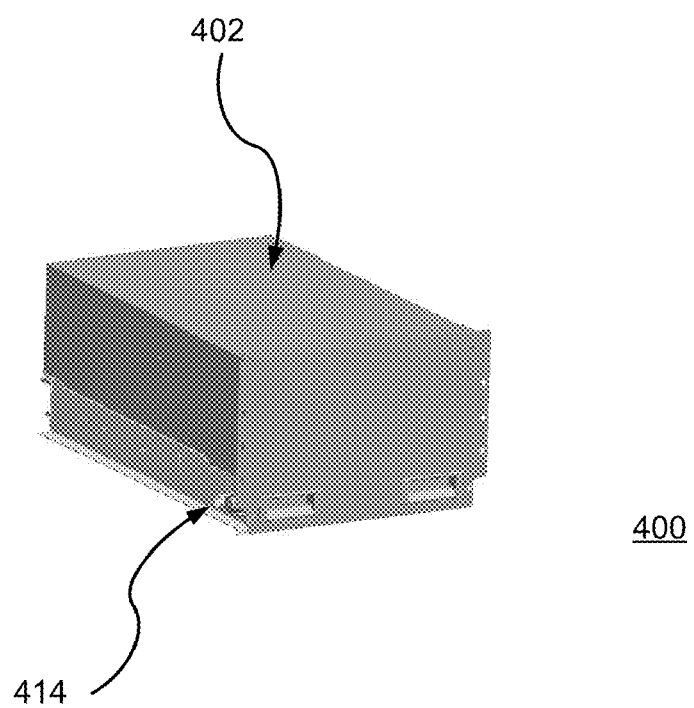

FIG. 4A shows a rear/top/right side view of the fuel cell 400 and FIG. 4B shows a front/top/left side view of the fuel cell 400. The fuel cell 400 includes a sealed fuel cell enclosure 402. A hydrogen gas feed is plumbed into the cabinet and into a hydrogen feed fitting in the fuel cell enclosure 402. The fuel cell enclosure 402 also includes an air feed fitting 414 for receiving air from an air feed system (e.g., 202, 301) into the fuel cell 400. The enclosure 402 includes a plenum sealing collar 404 for sealing a first end of the fuel cell 400 to a plenum 500 (FIGS. 5A, 5B) for hydrogen declassification. The plenum sealing collar 404 includes a cathode exhaust 412 and an anode exhaust 410. The fuel cell enclosure 402 includes liquid feed interface fittings 406 for permitting the cooling liquid to enter and exit the fuel cell 400. The fuel cell 400 can be a liquid cooled hydrogen fuel cell based on exchange membrane (PEM) technology. The fuel cell 400 can be, for example, an 8 kW fuel cell. In an aspect, two 8 kW fuel cells 400 can be used to provide a 16 kW fuel cell system.

Figure 5A:
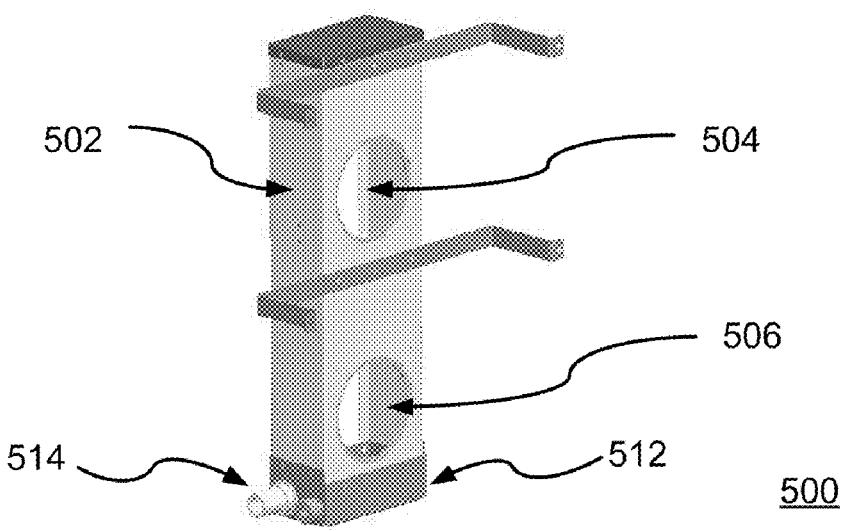
FIGS. 5A-5B are perspective views of a plenum, according to an embodiment of the invention.

As shown in FIG. 5A, the plenum 500 includes a casing 502 having intakes 504, 506 on a first side (i.e., a front side). Each of the intakes is surface mounted and sealed against the plenum sealing collar 404 of a fuel cell 400. The intakes 504, 506 can include O-rings for sealing the plenum 500 to the fuel cells 400. In this aspect, the plenum 500 seals against the fuel cell enclosures 402 of two vertically stacked fuel cells 400.

Figure 5B:
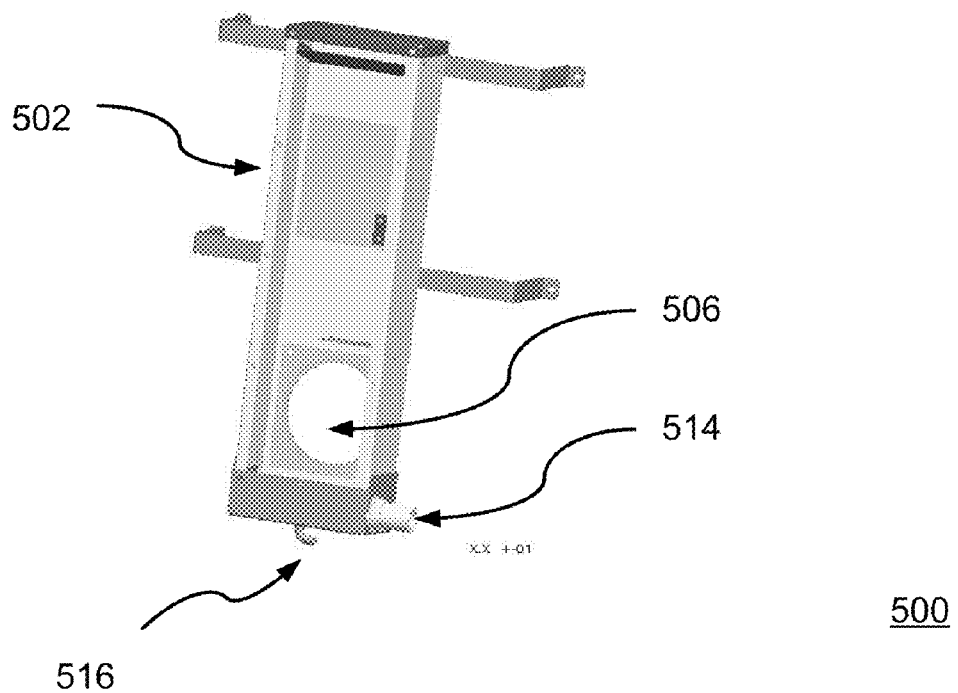

As shown in FIG. 5B, the other side (i.e., the rear side) of the casing 502 seals against an inside surface of a door of the fuel cell cabinet 100. The plenum 500 includes a sealed base 512 that captures the water from the one or more fuel cells 400 during operation. A sealed drain fitting 516 on the bottom of the plenum 500 interfaces the plenum to another drain hose.

An exemplary aspect of a fuel cell cabinet having an air feed and exhaust system for hydrogen declassification according to an aspect of the invention will now be described with reference to FIGS. 6-10.

Figure 6:
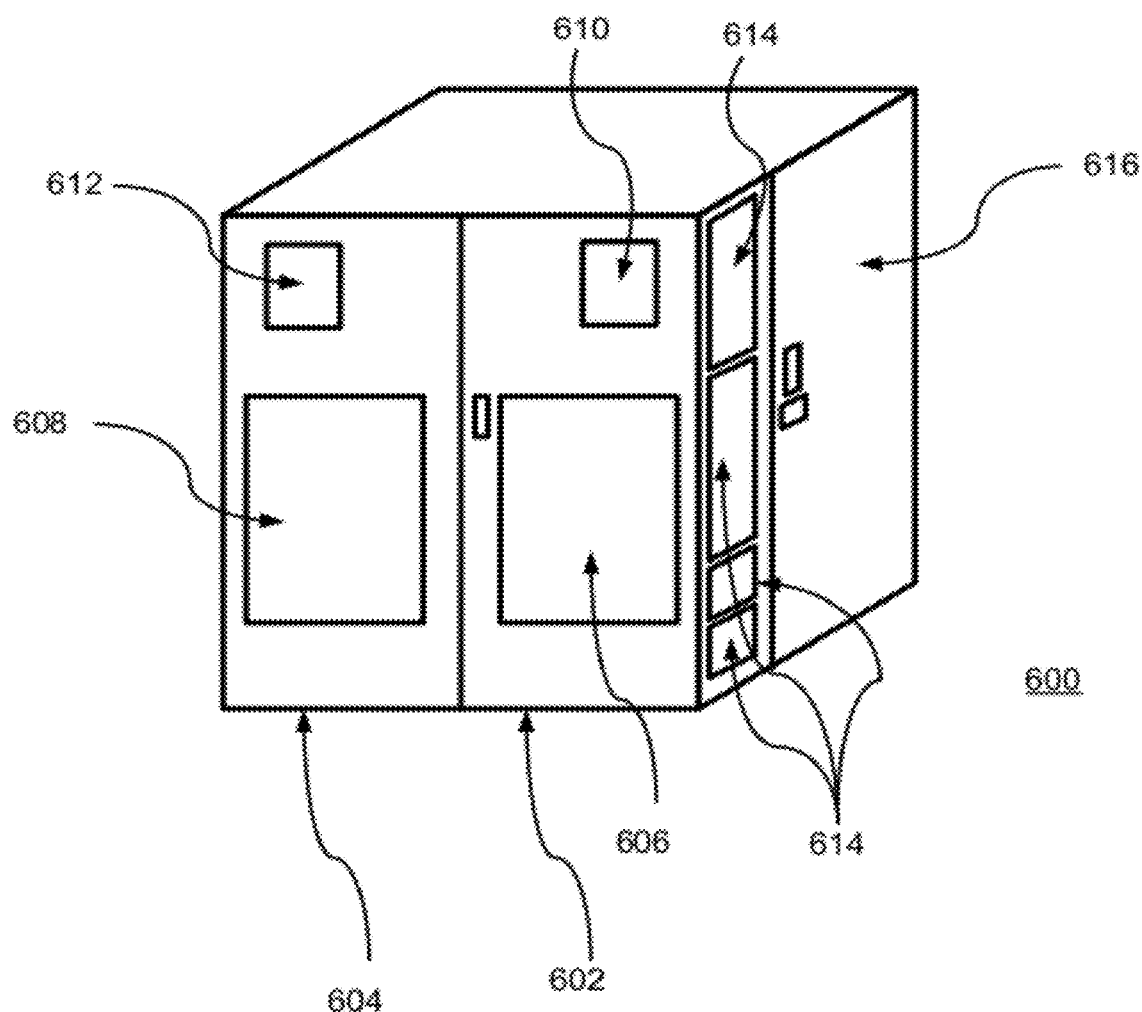
FIG. 6 is a perspective view of a cabinet, according to an embodiment of the invention.

FIG. 6 shows an aspect of a fuel cell cabinet 600 having one or more fuel cells 400, a liquid cooling system, an air feed system, an exhaust system for hydrogen declassification, and a waste water management system. The fuel cell cabinet 600 includes four sides, a top, and a bottom. The fuel cell cabinet 600 includes one or more doors 602, 604 on a first side of the cabinet 600. The cabinet 600 includes one or more doors 616 on a second side (i.e. front side) of the cabinet 600 and one or more doors 640 on a third side (i.e., rear side) of the cabinet 600. The fuel cell cabinet 600 also may include one or more doors on the fourth side of the cabinet 600, which are not shown. The doors 602, 604 include air inlet and door perforations 610, 612, and 614. The fuel cell cabinet 600 includes air exits 606, 608 on one or more sides, such as the second side (i.e., front side) and the third side (i.e., rear side).

Figure 7:
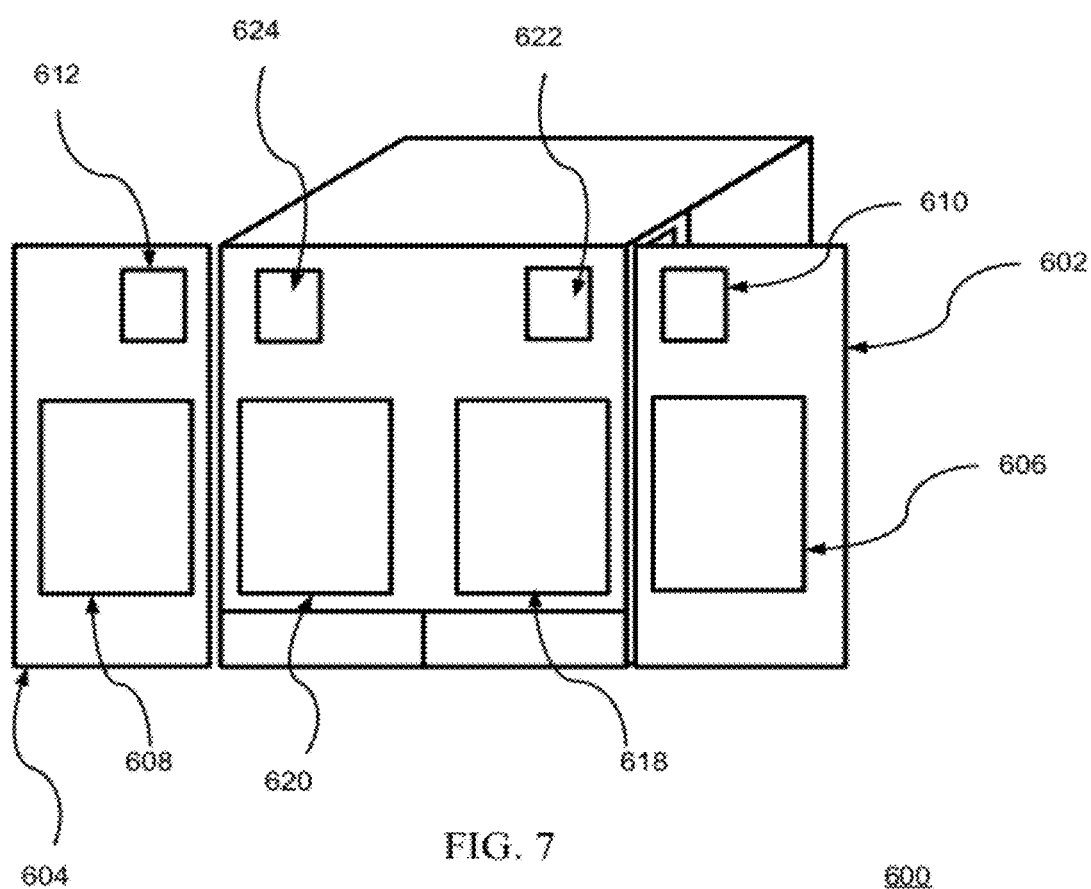
FIG. 7 is another perspective view of the cabinet of FIG. 6.

FIG. 7 shows an aspect of the fuel cell cabinet 600 of FIG. 6 with the doors 602, 604 in an open position. The cabinet 600 includes one or more air filters 622, 624 that cooperate with the air inlets and door perforations 610, 612 of the doors 602, 604. The ambient air from the exterior of the cabinet 600 is drawn through the air filters 622, 624 into the air feed system. The cabinet 600 also may include one or more fan and liquid-to-air heat exchanger assemblies (Fan/L-A Hex assemblies) 618, 620 (e.g., radiator fans and radiators) that cooperate with the air exits and door perforations 606, 608 of the doors 602, 604.

Figure 8:
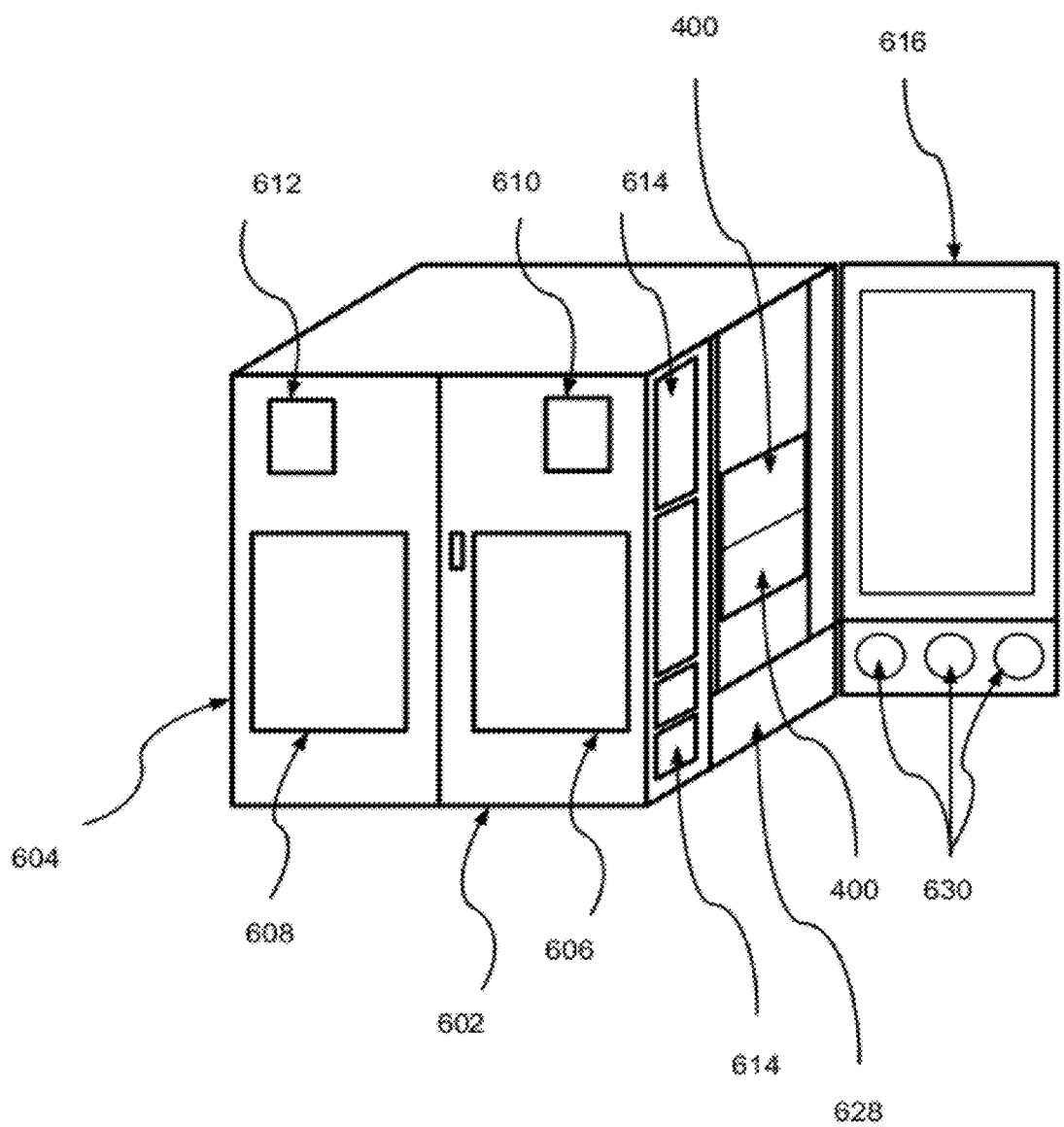
FIG. 8 is another perspective view of the cabinet of FIG. 6.

FIG. 8 shows an aspect of the fuel cell cabinet 600 of FIG. 6 with the door 616 in an open position. The cabinet 600 includes one or more fuel cells 400 disposed and mounted in the interior of the cabinet 600. The cabinet may include a rack or shelving system for mounting or securing the fuel cells 400 inside the cabinet 600. The cabinet 600 includes a battery compartment 628 for mounting or securing backup batteries. The door 616 may include a fan system 630 including one or more fans for venting or exhausting air or gases from the battery compartment 628.

The fuel cell cabinet 600 may include one or more cooling loops for controlling the temperature of the fuel cells 400, such as a single cooling loop or a dual cooling loop. One of ordinary skill in the art will recognize that the single or dual cooling loops can be incorporated into the fuel cell cabinet in a variety of ways and may include a number of configurations and elements for providing the single or dual cooling loops.

Figure 9:
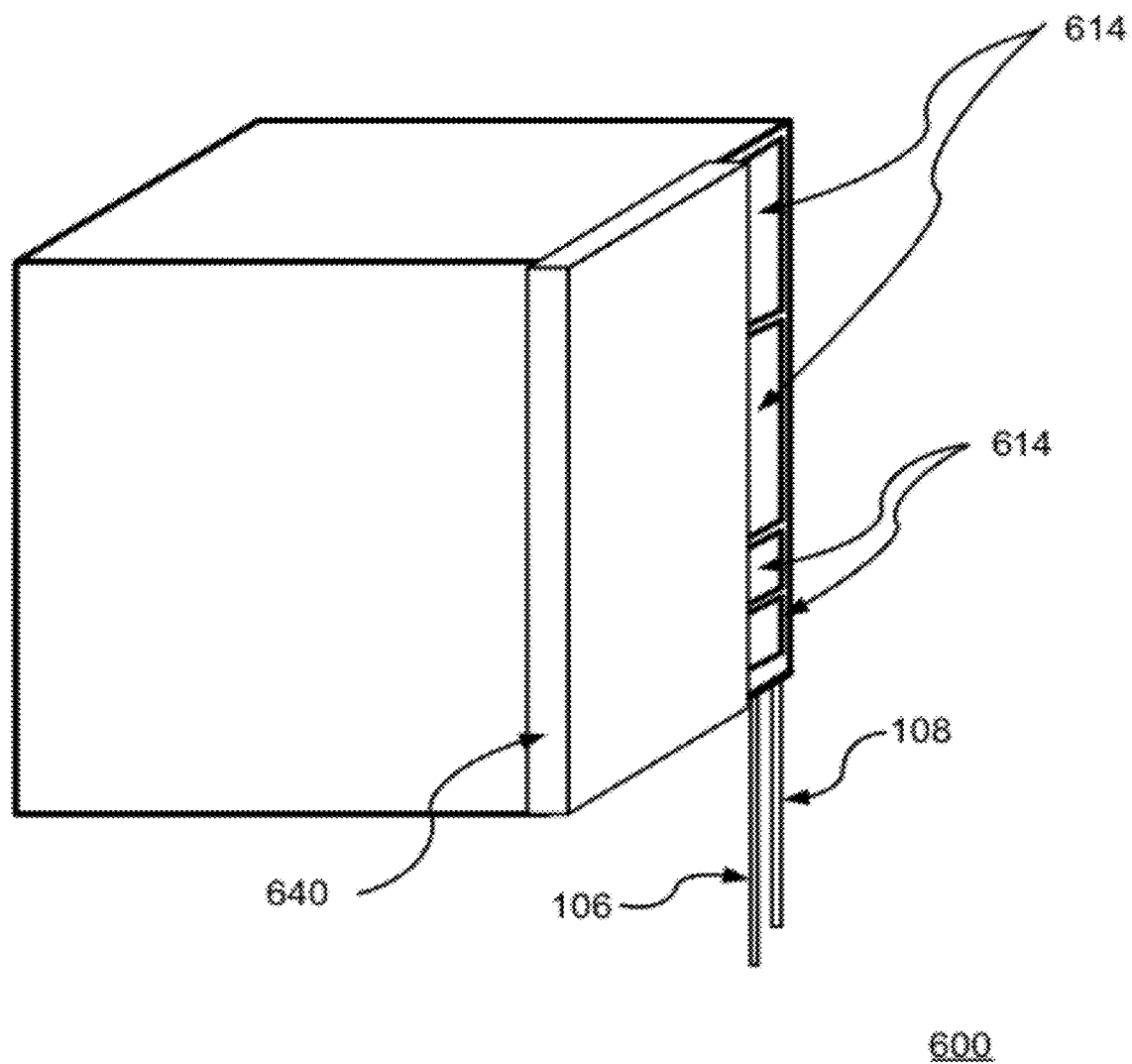
FIG. 9 is another perspective view of the cabinet of FIG. 6.
Figure 10:
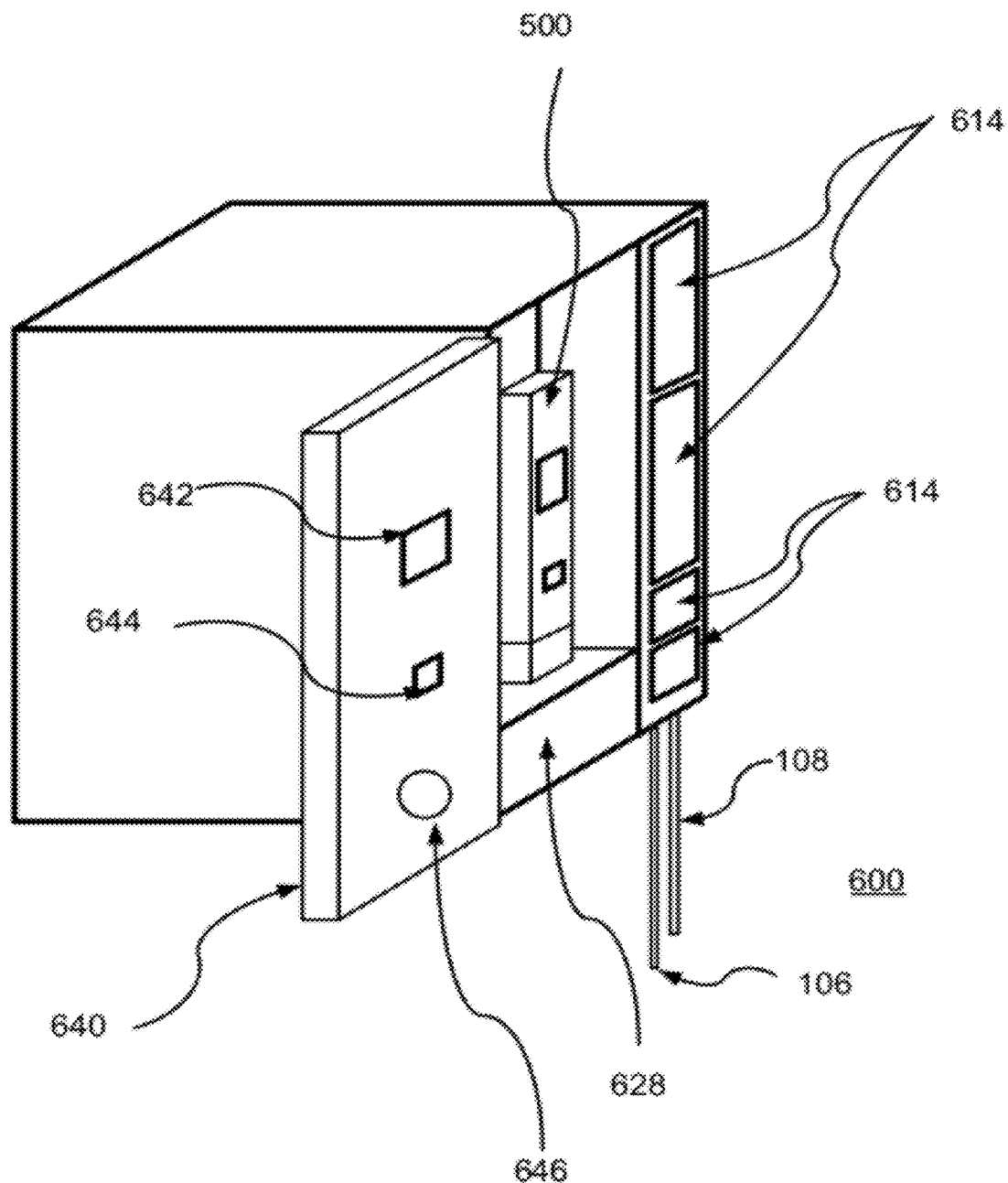
FIG. 10 is another perspective view of the cabinet of FIG. 6.
Figure 11:
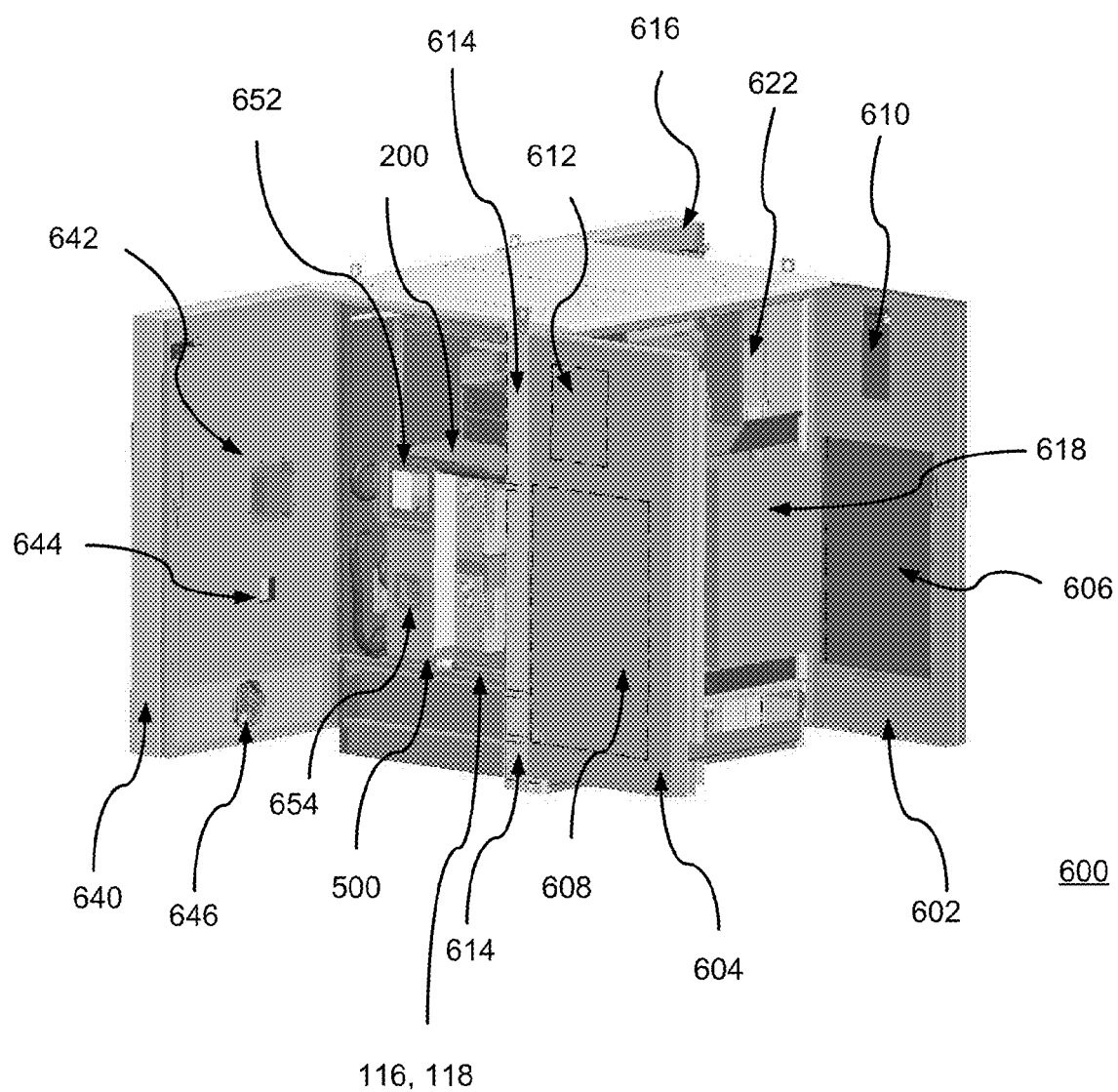
FIG. 11 is a perspective view of a cabinet, according to an embodiment of the invention.
Figure 12:
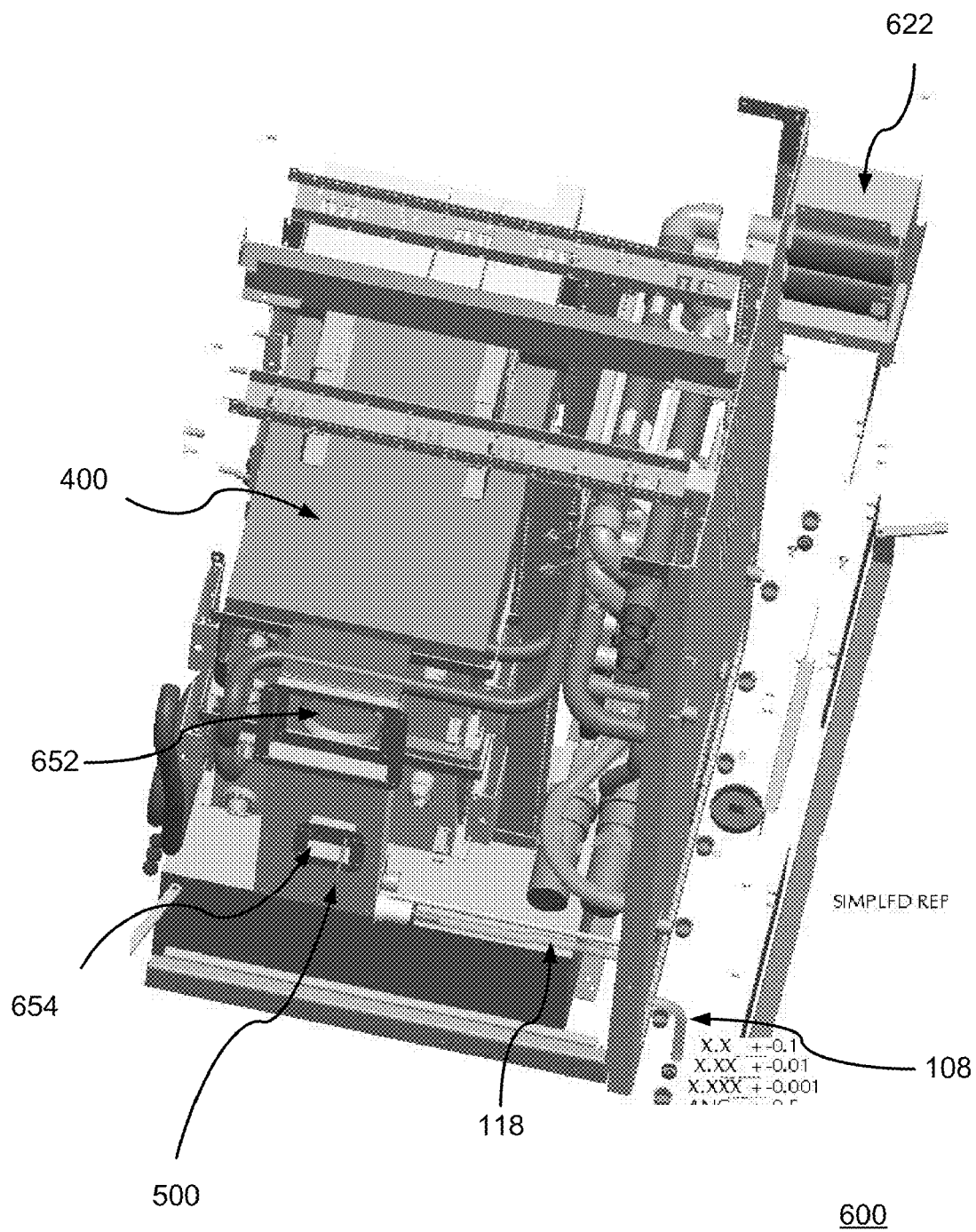
FIG. 12 is another perspective view of the cabinet of FIG. 11.

FIG. 9 shows an aspect of the fuel cell cabinet 600 with the door 640 in a closed position. FIG. 10 shows the fuel cell cabinet 600 with the door 640 in the open position. The door 640 includes a fan system or exhaust system, which will be described in more detail below. When the door 640 is in a closed position, the plenum 500 is sealed against the inside surface of the door 640 and communicates with the fan system or exhaust system 642, 644, 646 of the door 640. The other side of the plenum 500 (not shown in FIG. 10) is sealed against the plenum sealing collar 404.

The fuel cell cabinet 600 can include air inlets 614. In this aspect, a splice chamber is located behind the air inlets 614. The sealed plenum base 512 collects and manages the flow of the water from the fuel cells 400 to the drain lines 106, 108. In an aspect, the drain lines 106, 108 extend through the splice chamber wall and down below the cabinet 600, as shown in FIG. 10. The drain lines 106, 108 exit from the bottom of the splice compartment into a drain pipe. In another aspect, a pipe or tube or set of pipes or tubes can connect the plenum 500 to the drain lines 106, 108. In other aspects, the drains lines 106, 108 can be combined into a single drain line.

An exemplary aspect of a fuel cell cabinet having an air feed and exhaust system for hydrogen declassification according to an aspect of the invention will now be described with reference to FIGS. 11-13B. One of ordinary skill in the art will recognize that the aspects are not limited to the particular arrangement of elements shown in FIGS. 11-13B, and other arrangements can be provided within the spirit and scope of the present invention.

In this aspect, the fuel cell cabinet includes an air feed and exhaust system for hydrogen declassification, and a plenum 500. The cabinet 600 includes an access door 640 having a fan system 642, 644, 646 that draws air through a plenum 500, the fuel cells 400, and the air feed system (e.g., filter 622).

When the door 640 is in a closed position, the plenum 500 is sealed against the inside surface of the door 640 and communicates with the fan system or exhaust system 642, 644, 646 of the door 640. More particularly, the plenum 500 includes air exits 652, 654 that seal against the door 640 and fan system behind openings 642, 644, 646. As illustrated in FIG. 5, the plenum 500 also includes intakes 504, 506 that seal against the plenum sealing collar 404 of the fuel cells 400. The plenum 500 also includes a sealed plenum base 512 that collects and manages the flow of the water from the fuel cells 400 to the drain lines 106, 108.

As shown in FIGS. 11-13B, the cabinet 600 includes a sealed subsystem having one or more hydrogen fuel cells 400 with hydrogen gas plumbed into the fuel cells 400 within the cabinet 600. The cabinet also includes an air feed and exhaust system.

Figure 13A:
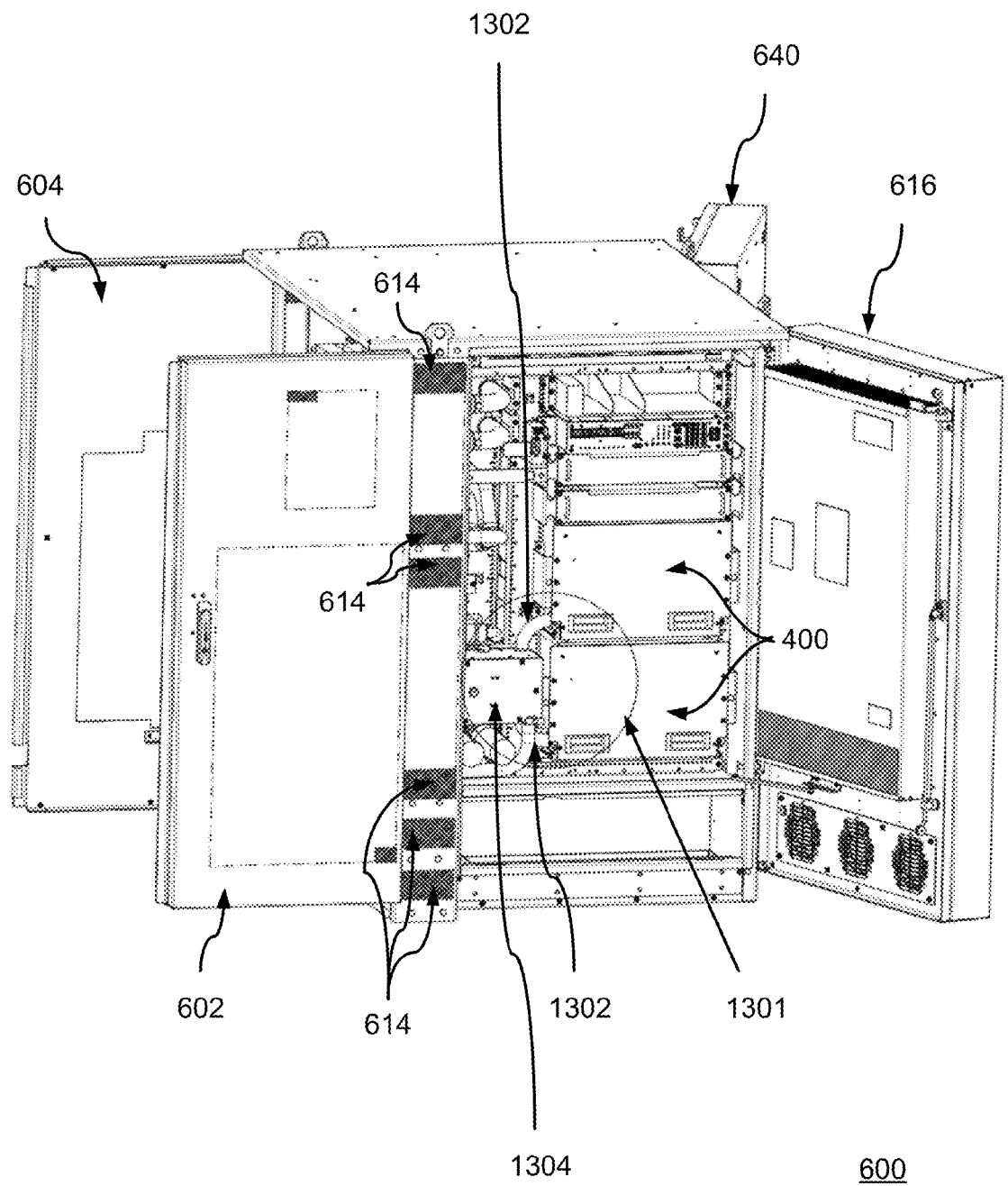
FIG. 13A is a perspective view of the cabinet, according to an embodiment of the invention.
Figure 13B:
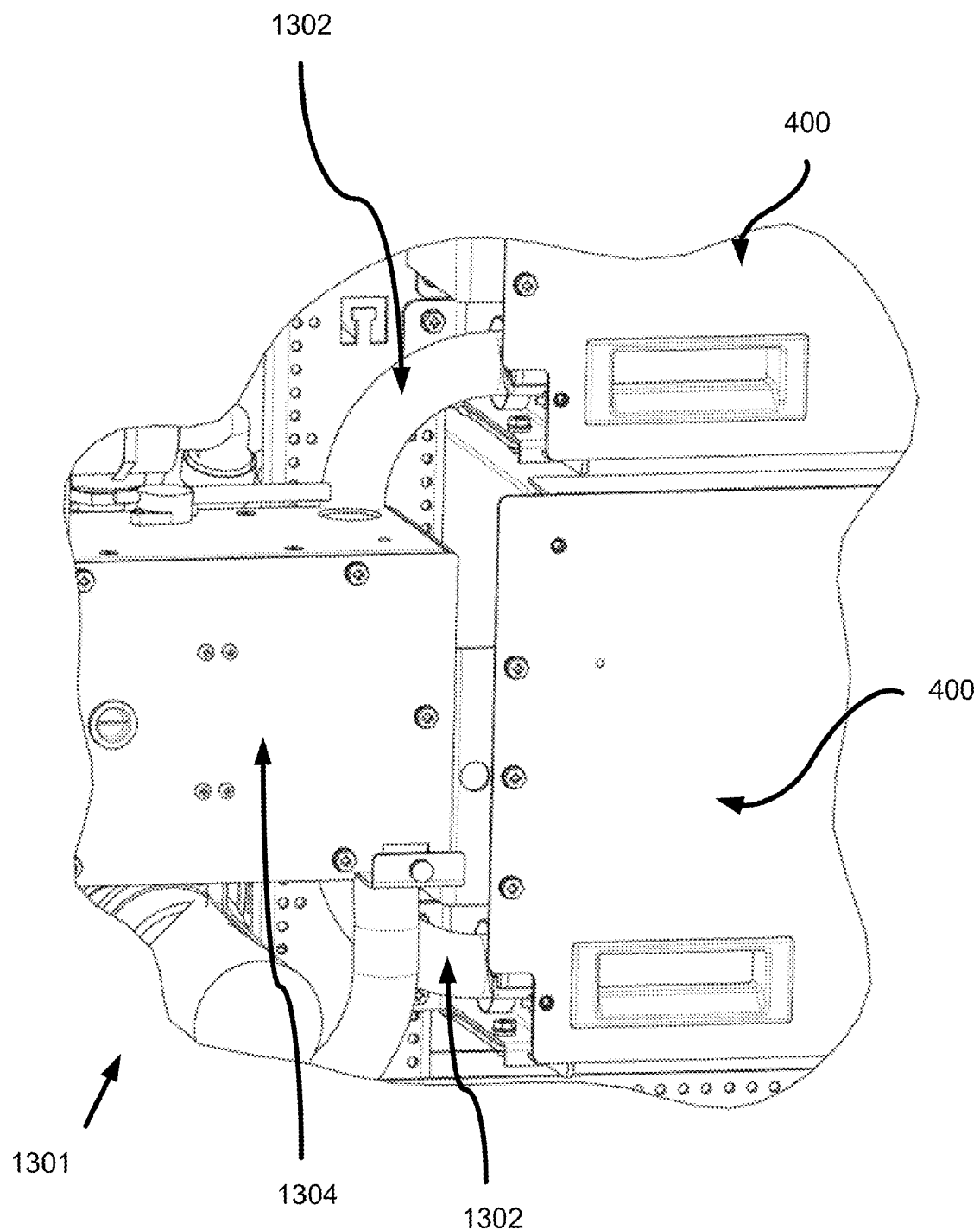
FIG. 13B is a partial, perspective view of the cabinet of FIG. 13A.

An aspect of an exemplary air feed system 1301 will be described with reference to FIGS. 13A and 13B. In operation, air enters the cabinet 600 from the exterior through, for example, air inlets 614 and is pulled into the air feed system 1301. The air feed system 1301 can include a housing 1304, which can be a sealed housing. In an aspect, the air feed system 1301 can include an air filter (not shown) inside the housing 1304. In another aspect, the air feed system 1301 can include an optional air preheat assembly 1305 having one or more heaters. The air preheat assembly 1305 receives the intake air and preheats the intake air to a predetermined temperature, or to be within a predetermined temperature range. For example, the air preheat assembly 1305 can receive intake air having an ambient air temperature of 0° C. and preheat the air to a temperature equal to or greater than 5° C. prior to entering the fuel cell 400. The optional air preheat assembly 1305 can maintain a substantially constant air feed temperature to the fuel cell 400. In another aspect, a controller (not shown) can selectively control the temperature of the air in the air preheat assembly 1305.

It is noted that, in this aspect, the air feed system for hydrogen $H_2$ declassification is separate from an air feed system for supplying air to the fuel cells 400. However, in other aspects, the air feed system for hydrogen declassification and for supplying air to the fuel cells 400 can be integrated into a single air feed system such that, for example, a common air intake, filter, preheat assembly, etc. can be shared by the systems.

With reference again to FIGS. 13A and 13B, the air from the air feed system 1301 is supplied to one or more fuel cells 400 by one or more a sealed air feed lines or tubes 1302. The sealed air feed line 1302 delivers outside air to the sealed internal fuel cell 400. The fuel cell 400 exhausts the air to the plenum 500, which is sealed to the fuel cell 400. The exhaust plenum 500 is sealed to the sealed casing 402 of the fuel cell 400 and the rear door 640 of the cabinet 600, thereby creating a completely sealed subsystem within the cabinet 600.

The cabinet 600 includes a rear door 640 having a plurality of fans that pull fresh air through the air feed line 1302 into the box containing the fuel cells 400, and through the plenum 500 that seals against box containing fuel cells 400 and against the rear door 640. The plenum 500 has a separate anode purge line 654 with water knock out that seals against the opening 644 in the door 640 such that water within the anode purge line 654 drips into the sealed base 512 of the plenum 500 and the gas enters through the opening 654 into a cavity of the door 640. The plenum 500 has a second opening 652 that seals against the door 640 to exhaust the fuel cell 400 and the cathode exhaust of the fuel cell 400. The openings 652, 654 includes seals for facilitating a substantially airtight seal with the surface of the rear door 640.

The rear door 640 has a main fan set and secondary fan set. The first fan set is dedicated to the fuel cell and its subsystem and pulls fresh air through the air feed line 1302 into the box containing the fuel cells 400 and through the plenum 500 that seals against box containing fuel cells 400 and against the rear door 640.

In this aspect, the rear door 640 includes a second fan that is mounted in a bottom of the rear door 640 to insure whatever gases are exhausted into the cavity in the rear door are vented outside of the cabinet 600.

An aspect provides an advantage of forming a sealed subsystem within the fuel cell cabinet. Because the subsystem is sealed throughout and vents directly to the outside environment, the subsystem may require explosion proof certification/approval of the subsystem components only. Therefore, the aspect may not require any other components outside of the sealed subsystem to obtain explosion proof certification, which may reduce costs and complexity associated with the certification/approval process.

In an aspect, a controller (not shown) controls the operation of the main fan set and the secondary fan set. The controller can selectively control one or more fans in the exhaust system to provide a predetermined air flow rate, which may depend on factors such as whether the fuel cell is preparing to start up, whether the fuel cell is operating, or whether the fuel cell has ceased operating, as well as the outside (ambient) temperature of the cabinet.

In other aspects, the air flow rate through the air feed lines, the fuel cell, the plenum, and/or the cavity of the door 640 can optimized to improve the efficiency of the air feed and exhaust system. The air flow resistance in the system also can optimized to improve the efficiency of the air feed and exhaust system.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto. Furthermore, although elements of the invention may be described or claimed in the singular, the plural is contemplated unless limitation to the singular is explicitly stated.

What is claimed is:

1. A cabinet comprising:
   electronic equipment housed within said cabinet, wherein said electronic equipment is connected with provider lines and/or subscriber lines; and
   a fuel cell power backup system for providing backup power to said electronic equipment in the case of a power failure, wherein said fuel cell power backup system is housed within said cabinet and wherein said fuel cell power backup system includes:
      a fuel cell disposed inside said cabinet for generating the backup power;
      a sealed air feed system that feeds air from outside of said cabinet to said fuel cell disposed inside said cabinet; and
   a sealed air exhaust system that exhausts air from said fuel cell to the outside of said cabinet, wherein each of said sealed air feed system and said sealed air exhaust system is sealed with respect to said fuel cell such that said sealed air feed system, said sealed air exhaust system, and said fuel cell form a sealed subsystem within said cabinet.

2. The cabinet according to claim 1, wherein said sealed air exhaust system includes an exhaust fan that pulls air from the outside of said cabinet through said sealed air feed system and said fuel cell.

3. The cabinet according to claim 1, wherein said sealed air exhaust system includes:
   a first exhaust fan that pulls air from the outside of said cabinet through said sealed air feed system and said fuel cell and into a cavity within said cabinet; and
   a second exhaust fan that moves air exhausted by said first exhaust fan from said cavity within said cabinet to the outside of said cabinet.

4. The cabinet according to claim 3, wherein said cavity is in a door of said cabinet.

5. The fuel cell cabinet according to claim 3, wherein said first exhaust fan and said second exhaust fan are in said cavity of said cabinet.

6. The cabinet according to claim 1, wherein said sealed air exhaust system includes a sealed exhaust plenum mounted to said fuel cell in a sealed manner at one side of said sealed exhaust plenum and communicating in a sealed manner with an opening in a door of said cabinet at another side of said sealed exhaust plenum.

7. The cabinet according to claim 6, wherein said sealed air exhaust system includes an exhaust fan that pulls air from the outside of said cabinet through said sealed air feed system, said fuel cell, and said sealed exhaust plenum.

8. The cabinet according to claim 7, wherein said exhaust fan is in said door of said cabinet.

9. The cabinet according to claim 6, wherein said sealed air exhaust system includes:
   a first exhaust fan that pulls air from the outside of said cabinet through said sealed air feed system, said fuel cell, and said sealed exhaust plenum and into a cavity within said cabinet; and
   a second exhaust fan that moves air exhausted by said first exhaust fan from said cavity of within said cabinet to the outside of said cabinet.

10. The cabinet according to claim 9, wherein said cavity is in said door of said cabinet.

11. The cabinet according to claim 9, wherein said first exhaust fan and said second exhaust fan are in said cavity within said cabinet.

12. The cabinet according to claim 1, wherein said sealed air feed system includes a heater, and wherein said heater preheats air entering said fuel cell to a temperature that is equal to or greater than a predetermined minimum temperature.

13. The cabinet according to claim 2, wherein said exhaust fan provides an air flow rate through said fuel cell dependent upon a temperature outside of said cabinet.

14. The cabinet according to claim 6, wherein said another side of said sealed exhaust plenum seals against an inside surface of said door of said cabinet.

15. The cabinet according to claim 6, wherein said fuel cell is a first fuel cell and includes a first plenum sealing collar, and further comprising:
   a second fuel cell stacked with said first fuel cell, said second fuel cell including a second plenum sealing collar, wherein said one side of said sealed exhaust plenum is mounted to said first plenum sealing collar in a sealed manner and is mounted to said second plenum sealing collar in a sealed manner, and wherein said another side of said sealed exhaust plenum seals against an inside surface of said door of said cabinet.

16. A cabinet comprising:
electronic equipment housed within said cabinet, wherein said electronic equipment is connected with provider lines and/or subscriber lines; and
a fuel cell power backup system for providing backup power to said electronic equipment in the case of a power failure, wherein said fuel cell power backup system is housed within said cabinet and wherein said fuel cell power backup system includes:
  a fuel cell disposed inside said cabinet for generating the backup power;
  an air feed system that feeds air from outside of said cabinet to said fuel cell disposed inside said cabinet; and
  an air exhaust system that exhausts air from said fuel cell to the outside of said cabinet, wherein said air exhaust system includes an exhaust fan, and wherein said exhaust fan is positioned such that said fuel cell power backup system operates under a vacuum from the intake of air from outside of said cabinet to the exhaust of air to outside of said cabinet, so as to reduce the likelihood of hazardous gases of the fuel cell escaping into the interior of said cabinet.

17. The cabinet according to claim 16, wherein said exhaust fan is located in a door of said cabinet.

18. A cabinet comprising:
electronic equipment housed within said cabinet;
a fuel cell power backup system for providing backup power to said electronic equipment in the case of a power failure, wherein said fuel cell power backup system is housed within said cabinet and wherein said fuel cell power backup system includes:
  a fuel cell disposed inside said cabinet for generating the backup power;
  a sealed air feed system that feeds air from outside of said cabinet to said fuel cell disposed inside said cabinet; and
  a sealed air exhaust system that exhausts air from said fuel cell to the outside of said cabinet, wherein each of said sealed air feed system and said sealed air exhaust system is sealed with respect to said fuel cell such that said sealed air feed system, said sealed air exhaust system, and said fuel cell form a sealed subsystem within said cabinet, and wherein the electronic equipment within said cabinet and outside of said sealed subsystem need not be certified as explosion proof for use in conjunction with a fuel cell.

19. The cabinet according to claim 18, wherein said air exhaust system includes an exhaust fan positioned such that said fuel cell power backup system operates under a vacuum from the intake of air from outside of said cabinet to the exhaust of air to outside of said cabinet, so as to prevent hazardous gases of the fuel cell from escaping into the interior of said cabinet.

20. A fuel cell cabinet air feed and exhaust system comprising:
a sealed air feed system that feeds air from outside a fuel cell cabinet to a fuel cell disposed inside the fuel cell cabinet; and
a sealed air exhaust system that exhausts air from the fuel cell to the outside of the fuel cell cabinet,
wherein each of the sealed air system and the sealed air exhaust system is sealed with respect to the fuel cell such that the sealed air system, the sealed air exhaust system, and the fuel cell form a sealed system,
wherein the sealed air exhaust system includes a sealed exhaust plenum mounted on the fuel cell,
wherein the sealed exhaust plenum is sealed with respect to the fuel cell, and
wherein the sealed air exhaust system includes an exhaust fan that pulls air from the outside of the fuel cell cabinet through the sealed air feed system, the fuel cell, and the sealed exhaust plenum.

* * * * *